(12) United States Patent
Ando (10) Patent No.: US 6,270,042 B1
(45) Date of Patent: Aug. 7, 2001

(54) GUIDE FOR BICYCLE CONTROL ELEMENT

(75) Inventor: Yoshiaki Ando, Osaka (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 09/521,659

(22) Filed: Mar. 8, 2000

(51) Int. Cl.$^7$ .................................................. F16L 3/08
(52) U.S. Cl. ........................... 248/65; 74/502; 280/288.4
(58) Field of Search ............................. 248/65, 67.7, 70, 248/73, 74.1; 74/502; 280/264, 288.4

(56) References Cited

U.S. PATENT DOCUMENTS

| | | | |
|---|---|---|---|
| 4,733,835 | 3/1988 | Schlanger et al. | 248/71 |
| 5,568,905 | 10/1996 | Smith, II | 248/65 |
| 6,015,118 * | 1/2000 | Oda | 248/65 |

FOREIGN PATENT DOCUMENTS

| | | |
|---|---|---|
| 361417 | 6/1999 | (CN) . |
| 0518203 | 12/1992 | (EP) . |

OTHER PUBLICATIONS

Shimano Catalog, "Shimano Bicycle System Components" Apr. 1982, p. 432.

* cited by examiner

*Primary Examiner*—Ramon O. Ramirez
(74) *Attorney, Agent, or Firm*—shinjyu Global IP Counselors, LLP (57) ABSTRACT

A guide is provided to adjustably support a bicycle control element on a cable stopper of a bicycle. The guide basically includes a mounting member and a guide member. The mounting member is adapted to be coupled to a portion of a bicycle and has a first mating surface. The guide member is pivotally coupled to the mounting member about a pivot axis. The guide member has a guiding portion with a guide surface offset from the pivot axis and a second mating surface engageable with the first mating surface to adjustably maintain the guide member in a predetermined rotational position relative to the mounting member. One of the guide member and the mounting member has a threaded bore substantially perpendicular to the pivot axis. A bolt is threadedly coupled within the threaded bore and is adapted to engage a surface of the bicycle in a substantially perpendicular relationship. A washer is arranged between the guide member and the bolt. The guide surface is configured to receive the inner wire of a control cable. In an alternate embodiment, the guide surface is configured to receive the outer casing of a control cable. In an alternate embodiment, the guide surface is configured to receive a hose for a fluid actuated component. In an alternate embodiment, the washer is provided with a protrusion and the protrusion is arranged between an end of the bolt and a surface of the bicycle.

43 Claims, 8 Drawing Sheets

GUIDE FOR BICYCLE CONTROL ELEMENT

BACKGROUND OF THE INVENTION

1. Field of the Invention

This invention generally relates to a guide for a bicycle control element. More specifically, the present invention relates to an adjustable guide for supporting a control element in a cable stopper.

2. Background Information

Bicycling is becoming an increasingly popular form of recreation as well as a means of transportation. Moreover, bicycling has become a very popular competitive sport. Whether the bicycle is used for recreation, transportation or competition, the bicycle industry is constantly improving their components. In particular, bicycle components are constantly becoming lighter and less expensive while maintaining a high level of performance. Moreover, bicycle components are constantly being designed so as to be more durable and attractive. One particular component that has been extensively redesigned over the past years is the cable guide or cable harness.

Typically, bicycles have a plurality of cable stoppers welded or brazed on to the frame of the bicycle. The cable stoppers are usually configured to guide an inner wire and housing of a control cable for other components mounted on the bicycle. However, when a component of the bicycle is replaced or upgraded, sometimes the existing system of cable stoppers of the bicycle frame is inadequate to guide the control element for the new component. Therefore, the performance of a new component can be diminished or even inoperable if the existing system of cable stoppers is utilized.

The performance of existing components may also be diminished if the existing system of cable stoppers is utilized. Specifically, bicycles typically have a standard system of cable stoppers, which do not always effectively accommodate the control elements for certain bicycle components. More specifically, the performance of certain bicycle components can be compromised or diminished when the standard set of cable stoppers is used. Therefore, even if the cable stoppers are adequate, optimal performance of certain bicycle components may not be achieved due to longer cable runs, added friction in control cables or increased lengths of cable housing required. Moreover, the cable housing has an added weight which is undesirable for the bicycle.

In view of the above, there exists a need for a guide for a bicycle control element which overcomes the above mentioned problems in the prior art. This invention addresses this need in the prior art as well as other needs, which will become apparent to those skilled in the art from this disclosure.

SUMMARY OF THE INVENTION

One object of the present invention is to provide an adjustable guide for a bicycle control element that can be used with conventional cable stoppers.

Another object of the present invention is to provide a guide for a bicycle control element that optimizes performance of bicycle components.

Still another object of the present invention is to provide a guide for an inner wire of a bicycle control cable that reduces or eliminates the length of cable housing of the bicycle control cable.

Still another object of the present invention is to provide a guide for a bicycle control element that is simple and inexpensive to manufacture.

The foregoing object can basically be obtained by providing a guide for a bicycle control element having a mounting member and a guide member. The mounting member is adapted to be coupled to a portion of a bicycle and has a first mating surface. The guide member is pivotally coupled to the mounting member about a pivot axis. The guide member has a guiding portion with a guide surface offset from the pivot axis and a second mating surface engageable with the first mating surface to adjustably maintain the guide member in a predetermined rotational position relative to the mounting member.

The foregoing objects can basically be obtained by providing a guide for a bicycle control element having a mounting member and a guide member. The mounting member is adapted to be coupled to a portion of a bicycle and the guide member is pivotally coupled to the mounting member about a pivot axis. The guide member has a guiding portion with a guide surface and one of the guide member and the mounting member has a threaded bore substantially perpendicular to the pivot axis. A bolt is threadedly coupled within the threaded bore and is adapted to engage a surface of the bicycle in a substantially perpendicular relationship thereto.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Figure 1:
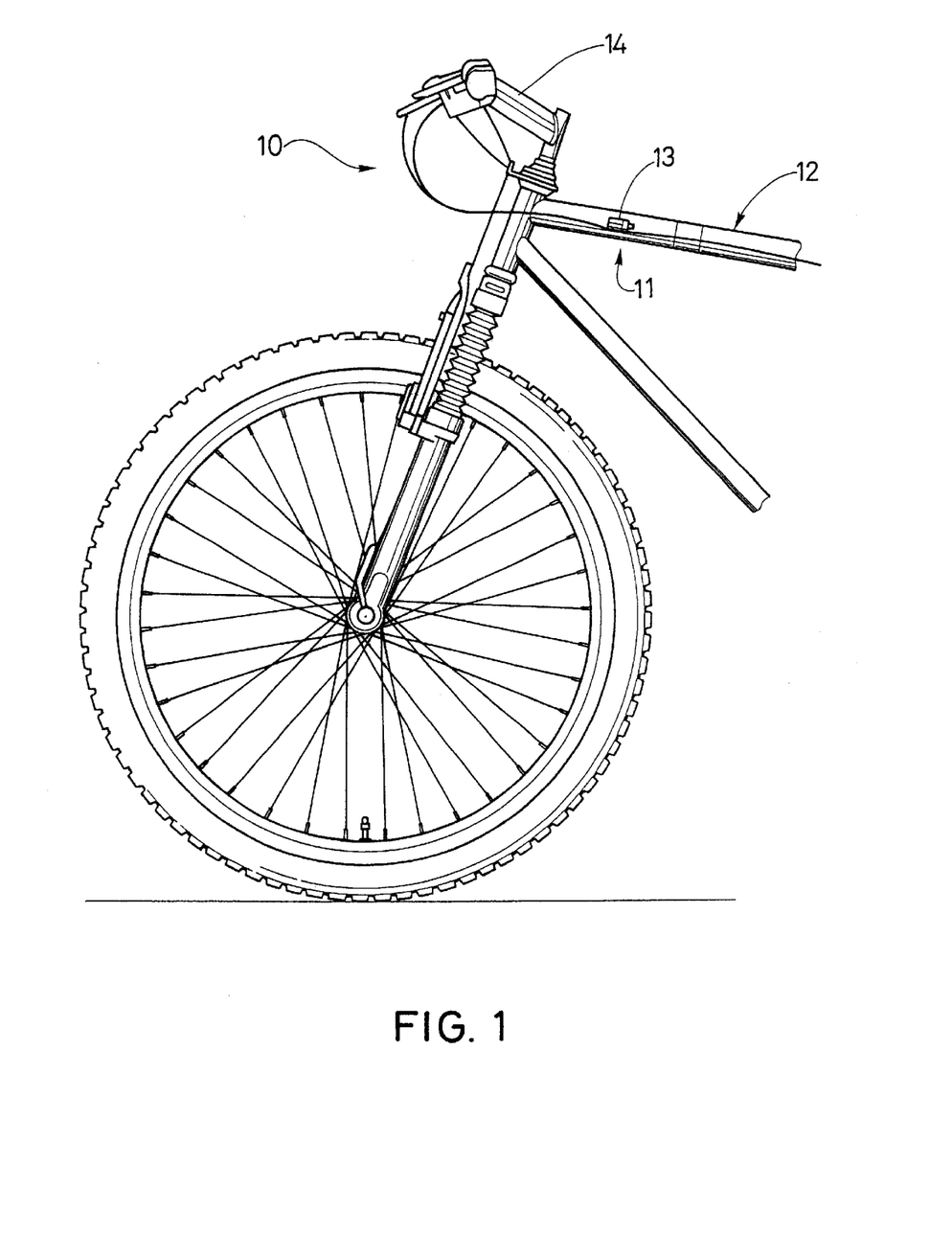
FIG. 1 is a left side elevational view of a bicycle with a guide for a bicycle control element in accordance with first embodiment of the present invention.
Figure 2:
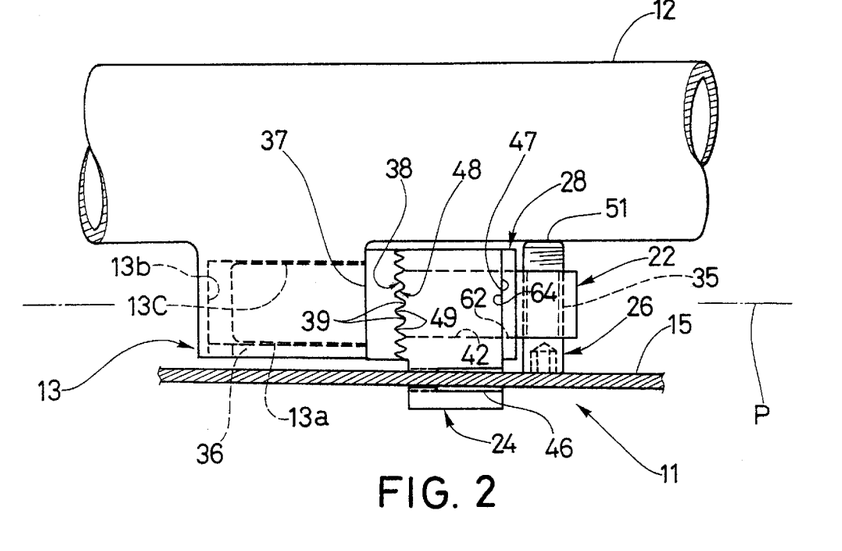
FIG. 2 is an enlarged, partial top plan view of a portion of the bicycle illustrated in F e 1 with the guide for a bicycle control element coupled thereto.

Referring initially to FIGS. 1 and 2, a conventional bicycle 10 (only a portion shown) is illustrated having a guide 11 in accordance with the present invention. Bicycles and their various components are well known in the prior art, and thus, bicycle 10 and its various components will not be discussed or illustrated in detail herein, except for the components of bicycle 10 which relate to guide 11. Guide 11 is coupled to frame 12 of bicycle 10 for guiding a bicycle control element along a portion of frame 12.

Bicycle 10 includes a handlebar 14 with a pair of brake operating mechanisms and a pair of derailleur operating mechanisms mounted thereto. The brake operating mechanisms and derailleur operating mechanisms are each operatively coupled to a bicycle component via a bicycle control element such as a control cable to actuate their respective components. A control cable has an inner wire 15 and an outer casing (not shown). The outer casing generally includes an inner low friction sleeve, a housing and an outer cover sleeve. Control cables are well known in the prior art, and thus, will not be discussed or illustrated in detail herein. Bicycle control elements or control cables are guided to their respective components along frame 12 via one or more cable stoppers or mounting portions 13. The brake operating mechanisms, derailleur operating mechanisms and bicycle control elements are conventional, and thus, will not be discussed or illustrated in detail herein.

Figure 4:
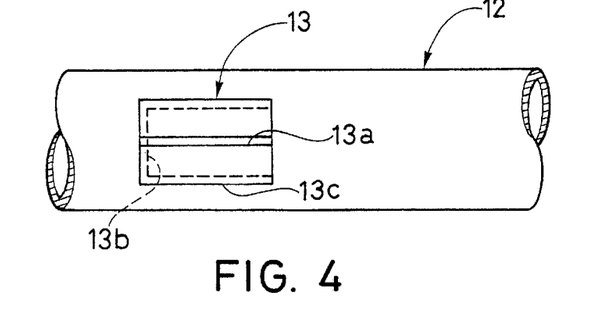
FIG. 4 is an enlarged, partial left side elevational view of a portion of the bicycle illustrated in figure 1 showing a first cable stopper or mounting portion.
Figure 5:
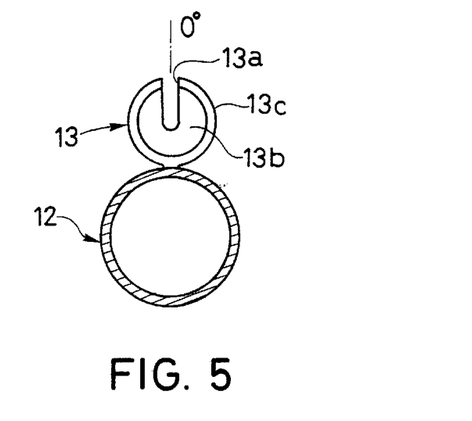
FIG. 5 is a right side elevational view of the portion of the bicycle with the first cable stopper or mounting portion illustrated in FIG. 4.
Figure 6:
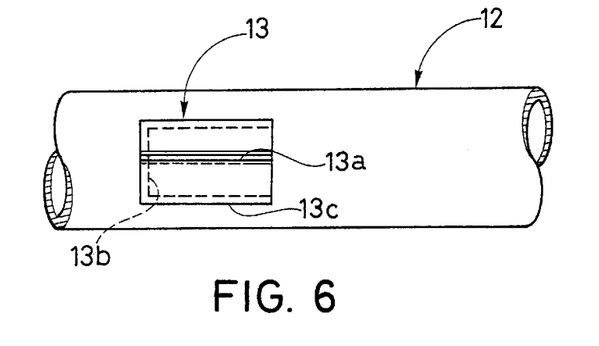
FIG. 6 is an enlarged, partial left side elevational view of another portion of the bicycle illustrated in FIG. 1 showing a second cable stopper or mounting portion rotated 10° in a direction relative to the first cable stopper or mounting portion.
Figure 7:
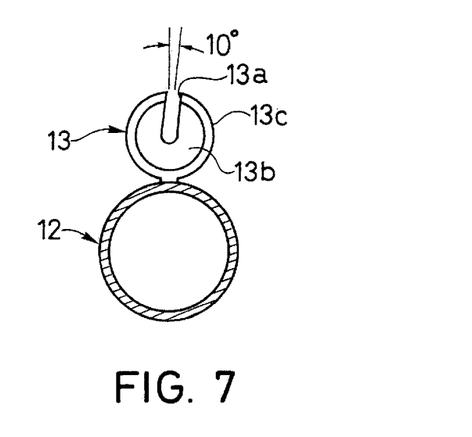
FIG. 7 is a right side elevational view of the portion of the bicycle with the second cable stopper or mounting portion illustrated in FIG. 6.
Figure 8:
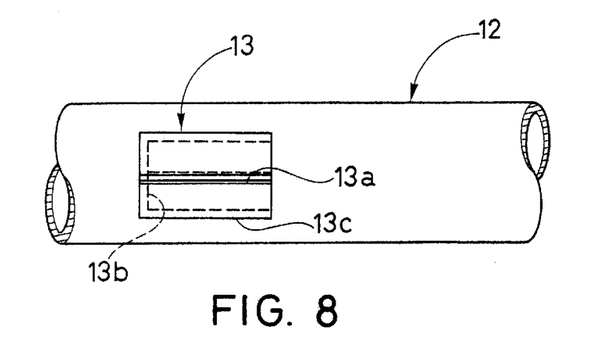
FIG. 8 is an enlarged, partial left side elevational view of yet another portion of the bicycle illustrated in FIG. 1 showing a third cable stopper or mounting portion rotated 10° second direction relative to the first cable stopper or mounting portion.
Figure 9:
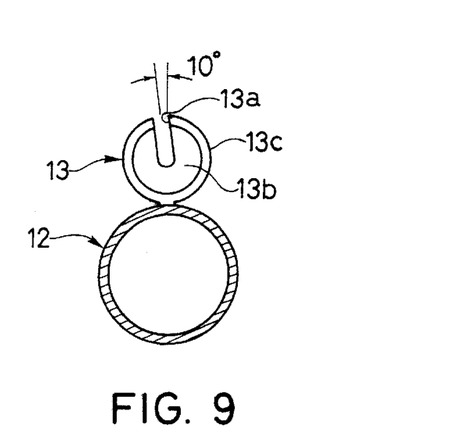
FIG. 9 is a right side elevational view of the portion of the bicycle with the third cable stopper mounting portion illustrated in FIG. 8.

As seen in FIGS. 4–9, a cable stopper 13 is also a conventional member that has a slot 13a, an abutment surface 13b and a tubular portion 13c in order to guide a conventional control cable. The slot 13a is normally configured to receive inner wire 15 therethrough. The abutment surface 13b is configured to abut the outer casing of the control cable. The tubular portion 13c is configured to slidably receive the outer casing of the control cable. More specifically, cable stopper 13 has a slot 13a that is perpendicular to the surface of frame 12 as best seen in FIGS. 4 and 5. Cable stopper 13 is welded or brazed to frame 12. During manufacture of frame 12, the cable stopper 13 can be attached such that the angle of slot 13a may vary plus or minus ten degrees from a position perpendicular to frame 12 as best seen in FIGS. 6–9.

Of course, it will be apparent to those skilled in the art from this disclosure that cable stopper 13 could be welded or brazed to frame 12 at different points or locations on frame 12 (not shown). For example, cable stopper 13 could be mounted to the top or bottom of frame 12 with slot 13a oriented up or down, respectively. Slot 13a is oriented to be substantially perpendicular to the surface of frame 12 regardless of the mounting location of cable stopper 13.

Figure 3:
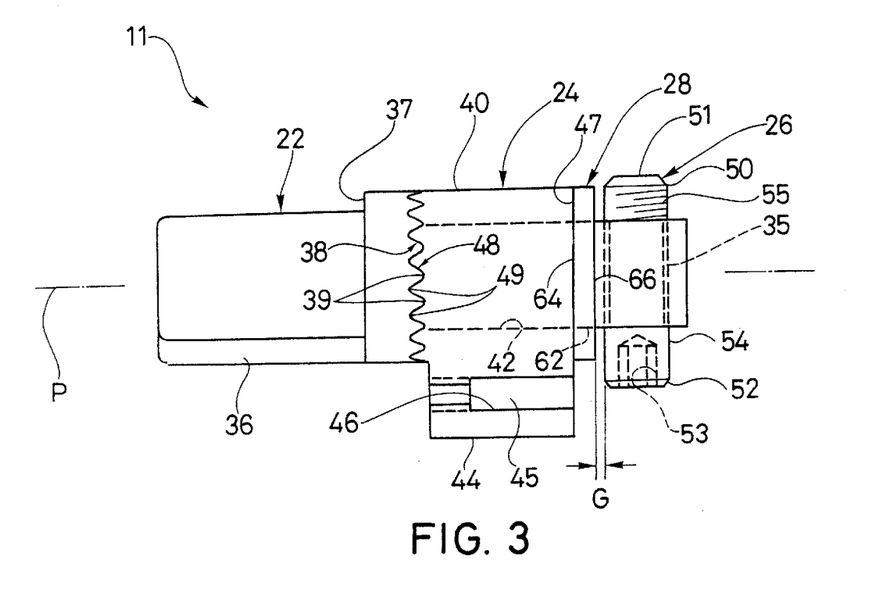
FIG. 3 is an enlarged top plan view of the guide for the bicycle control element illustrated in FIG. 2.

Referring now to FIGS. 2–3, guide 11 basically includes a mounting member 22, a guide member 24, a bolt 26 and a washer 28. Guide 11 is designed to be coupled to cable stopper 13 of bicycle frame 12. More specifically, mounting member 22 of guide 11 is designed to be partially received in tubular portion 13c of cable stopper 13. Guide member 24 is pivotally coupled to mounting member 22. Guide member 24 is configured to guide inner wire 15 along frame 12 and is adjustably maintained in a predetermined rotational position relative to mounting member 22. Washer 28 and bolt 26 are coupled to mounting member 22 to maintain the rotational position of guide member 24 relative to mounting member 22.

Referring now to FIGS. 10–13, mounting member 22 is elongated with step-shaped cylindrical sections. Mounting member 22 includes a mounting portion 30, an enlarged portion 32 and a shaft portion 34. Mounting portion 30 extends from one end of enlarged portion 32, while shaft portion 34 extends from the other end of enlarged portion 32. Mounting portion 30, enlarged portion 32 and shaft portion 34 are cylindrical portions having different diameters. Specifically, mounting portion 30 has a smaller diameter than enlarged portion 32, and shaft portion 34 has a smaller diameter than the diameter of mounting portion 30.

Mounting member 22 is preferably constructed of a rigid die cast material, such as cast aluminum and is preferably formed as a one-piece, unitary member. Of course, it will be apparent to those skilled in the art from this disclosure that mounting member 22 could be constructed of any suitable rigid material. It will also be apparent to those skilled in the art that mounting member 22 could be constructed of several pieces as needed and/or desired Mounting portion 30 of mounting member 22 is an elongated cylindrical member sized to be slidably received in tubular portion 13c of cable stopper 13. Preferably, mounting portion 30 has a longitudinal flange 36 sized to be received in slot 13a of cable stopper 13. Flange 36 prevents relative rotation between mounting member 22 and cable stopper 13.

Figure 10:
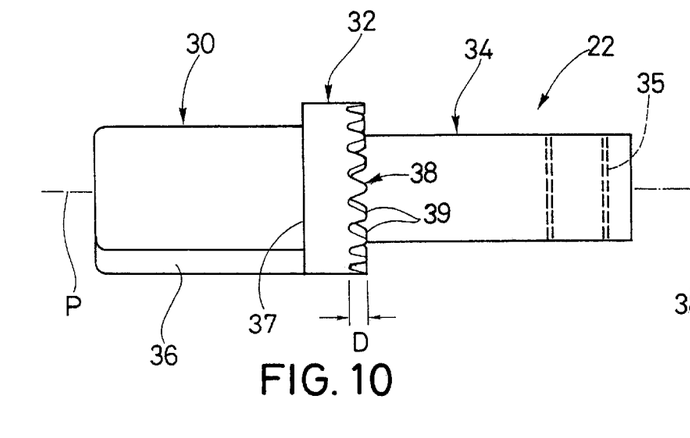
FIG. 10 is a top plan view of a mounting member of the guide for the bicycle control element illustrated in FIG. 3.
Figure 11:
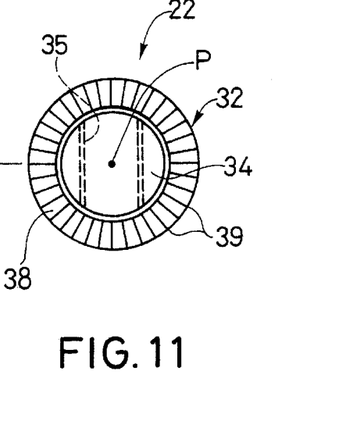
FIG. 11 is a right side elevational view of the mounting member illustrated in FIG. 10.
Figure 12:
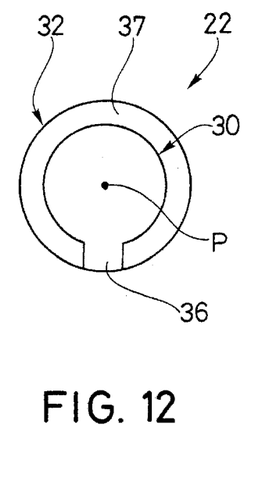
FIG. 12 is a left side elevational view of the mounting member illustrated in FIG. 10.
Figure 13:
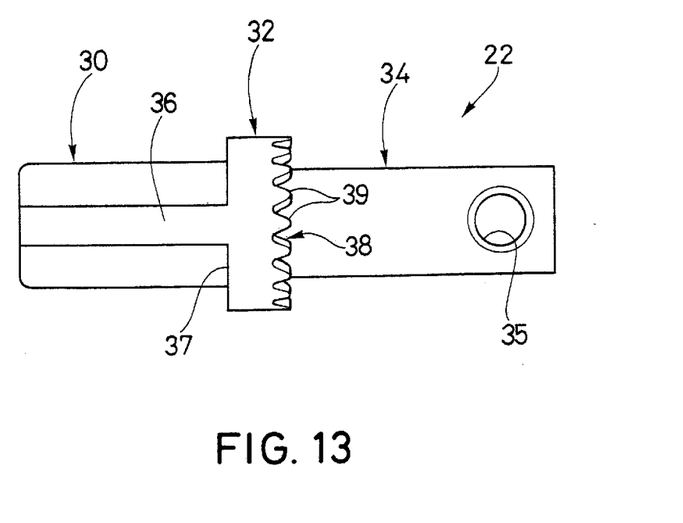
FIG. 13 is a front elevational view of the mounting member illustrated in FIG. 10.

Enlarged portion 32 is fixedly coupled to mounting portion 30 and has a diameter larger than mounting portion 30, as discussed above. The diameter of enlarged portion 32 is the same or slightly larger than the outer diameter of tubular portion 13c of cable stopper 13. Therefore, enlarged portion 32 has an abutment surface 37 facing toward mounting portion 30 for preventing axial movement of mounting member 22 relative to cable stopper 13. When mounting portion 30 is mounted in cable stopper 13, abutment surface 37 engages an end surface of cable stopper 13 to act as a stop surface against axial movement into tubular portion 13c, as seen in FIG. 2. A first mating surface 38 is provided on an end of enlarged portion 32 opposite the abutment surface 37. First mating surface 38 is provided with a plurality of teeth 39 for non-rotationally engaging guide member 24. Teeth 39 have an axial depth D as best seen in FIG. 10.

Shaft portion 34 extends from first mating surface 38 of enlarged portion 32 and is fixedly coupled to enlarged portion 32. Preferably, shaft portion is an elongated cylindrical member with a transverse threaded bore 35 formed therein. Preferably, shaft portion 34 has a diameter smaller than the diameter of mounting portion 30 and enlarged portion 32. Transverse threaded bore 35 is sized to threadedly receive bolt 26 therein. Additionally, transverse threaded bore 35 extends in substantially the same radial direction as flange 36 such that bolt 26 can perpendicularly engage the surface of the frame 12.

Referring again to FIGS. 4–9, three conventional cable stops 13 are illustrated for use with guide 11. Basically, as discussed above, the slot 13a of cable stop 13 lies in a plane that is oriented to be substantially perpendicular to a surface of the frame 12 (i.e. plus/minus 10 degrees). Therefore, mounting member 22 with flange 36 is designed to be used with cable stopper 13 even when the angle of the slot 13a varies plus or minus ten degrees from a position perpendicular to the surface of the frame 12. Bolt 26 can substantially perpendicularly engage the surface of the frame 12 even when the position of slot 13a varies plus or minus ten degrees from a position perpendicular to the surface of the frame 12. Of course, cable stopper 13 could be mounted at different locations on frame 12 as needed and/or desired, as discussed above.

Of course, it will be apparent to those skilled in the art from this disclosure that flange 36 could be removed from mounting portion 30 as needed and/or desired. Such a mounting member 22 could be utilized with cable stoppers where slot 13a is oriented at an angle more than plus/minus 10° (not shown) from a position perpendicular to the surface of the frame 12. If flange 36 is removed, mounting portion 30 of mounting member 22 could rotate in tubular portion 13c to orient threaded bore 35 to be perpendicular to the surface of the frame 12.

Referring to FIGS. 14–17, guide member 24 basically includes a cylindrical body portion 40 and a guide portion 44 extending from body portion 40. Guide member 24 is pivotally coupled to mounting member 22. Guide member 24 is preferably constructed of a rigid, die cast material, such as plastic resin material. Preferably, the plastic resin material of guide member 24, preferably has a low coefficient of friction when the guide member 24 is used to support a moving control element, such as inner wire 15. Also, guide member 24 is preferably constructed as a one-piece unitary member. Of course, it will be apparent to those skilled in the art from this disclosure that guide member 24 could be constructed of any suitable rigid material as needed and/or desired. Also, it will be apparent to those skilled in the art that guide member 24 could be constructed of several pieces as needed and/or desired.

Body portion 40 is a cylindrical portion with a through bore 42. The outer diameter of body portion 40 is the same as the diameter of enlarged portion 32 of mounting member 22. The inner diameter of through bore 42 is the same or slightly larger than the diameter of shaft portion 34 of mounting member 22. Body portion 40 is mounted on shaft portion 34 so that guide member 24 pivots about a pivot axis P passing through the longitudinal center line of mounting member 22. A second mating surface 48 and an abutment surface 47 are provided on opposite ends of body portion 40. Second mating surface 48 has a plurality of teeth 49 arranged to receive teeth 39 of first mating surface 38 in an interlocked relationship. Teeth 49 are a mirror image of teeth 39. Accordingly teeth 49 also have a depth D. Therefore, when teeth 39 and teeth 49 are engaged with each other, mounting member 22 and guide member 24 are interlocked to prevent relative rotation therebetween. Abutment surface 47 is designed to abut washer 28 when guide 11 is assembled.

Figure 14:
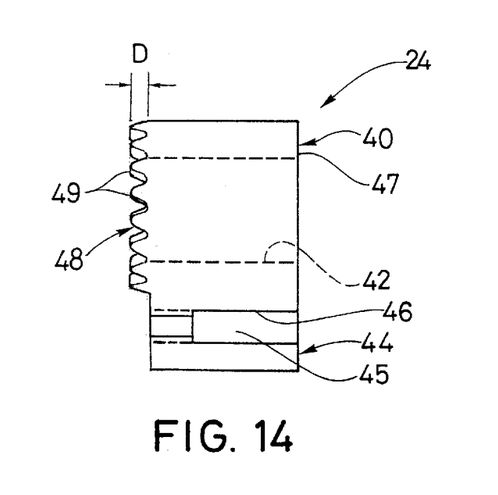
FIG. 14 is a top plan view of a guide member of the guide for the bicycle control element illustrated in FIG. 3.
Figure 15:
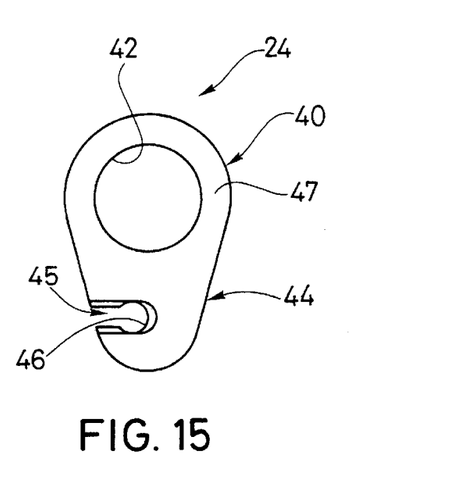
FIG. 15 is a right side elevational view of the guide member illustrated in FIG. 14.
Figure 16:
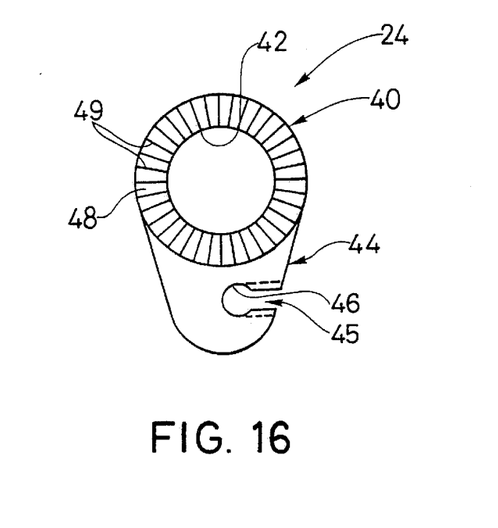
FIG. 16 is a left side elevational view of the guide member illustrated in FIG. 14.
Figure 17:
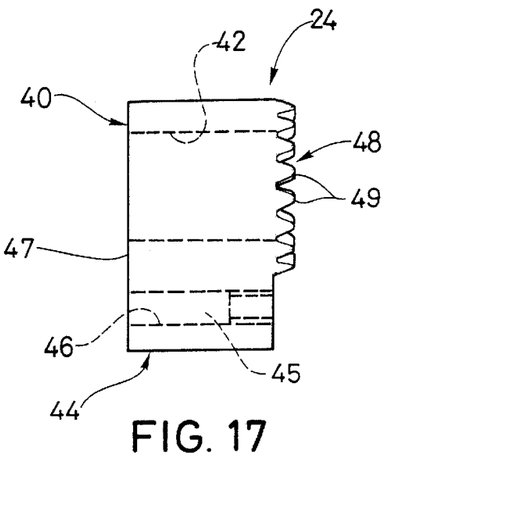
FIG. 17 is a bottom plan view of the guide member illustrated in FIG. 14.

Guide portion 44 extends from body portion 40 and has a guide surface 46. Guide surface 46 forms a recess 45 with a longitudinal axis that extends in a direction substantially parallel to pivot axis P. Preferably, recess 45 has a tapered surface extending at a 10 degree angle to the longitudinal axis of recess 45. Guide surface 46 is offset from pivot axis P to allow adjustment of the rotational position of guide surface 46 of guide member 24 relative to mounting member 22. Guide surface 46 is configured to receive an inner wire 15 of a control cable.

Figure 20:
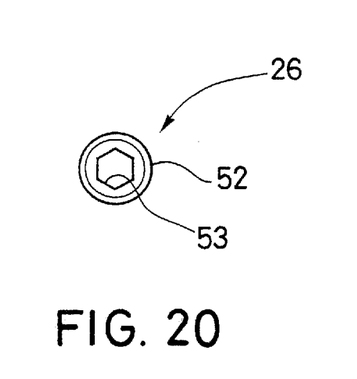
FIG. 20 is a left side elevational view of a bolt of the guide for the bicycle control element illustrated in FIG. 3.
Figure 21:
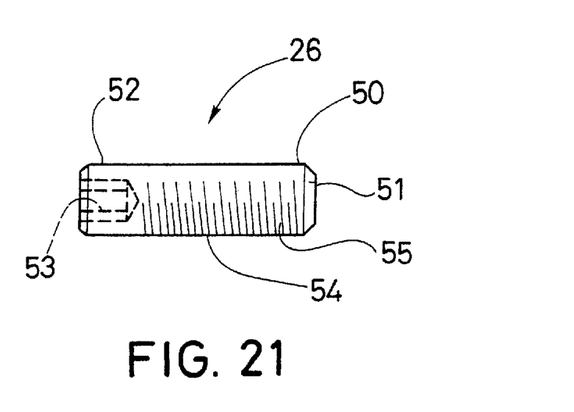
FIG. 21 is a right side elevational view of the bolt illustrated in FIG. 20.

Referring to FIGS. 20 and 21, bolt 26 is threadedly coupled to shaft portion 34 of mounting member 22. Specifically, bolt 26 is an elongated cylindrical member that is configured to be threadedly received in threaded bore 35 in a conventional manner, as seen in FIGS. 2 and 3. Bolt 26 has a first end portion 50, a second end portion 52 and a body portion 54. Bolt 26 is preferably formed of a rigid, die cast material, such as plastic resin material. Preferably, bolt 26 is formed as a one-piece unitary member. Of course it will be apparent to those skilled in the art from this disclosure that bolt 26 could be constructed of any suitable rigid material. It was also be apparent to those skilled in the art that bolt 26 could be constructed of several pieces as needed and/or desired.

First end portion 50 of bolt 26 has an abutment surface 51. Second end portion 52 of bolt 26 has a hexagonal bore 53 configured to receive a tool for rotation of bolt 26. Body portion 54 of bolt 26 has external threads 55 formed thereon to engage transverse threaded bore 35. Therefore, bolt 26 can be rotated in threaded bore 35 to adjust the transverse position of bolt 26 in threaded bore 35 relative to shaft portion 34. Bolt 26 is rotated until abutment surface 51 contacts the surface of frame 12. When abutment surface 51 contacts a surface of frame 12, mounting member 22 is gradually pushed away from frame 12 as bolt 26 is rotated. Therefore, a frictional force between mounting portion 30 and cable stopper 13 increases as bolt 26 is rotated. This frictional force maintains mounting member 22 in cable stopper 13. Moreover, a frictional force between abutment surface 51 and a surface of the frame 12 helps retain mounting member 22 in cable stopper 13

Bolt 26 also serves to retain guide member 24 on shaft portion 34 of mounting member 22. Specifically, bolt 26 has a length greater than the diameter of shaft portion 34. Therefore, guide member 24 is retained on shaft portion 34 by bolt 26 when bolt 26 is arranged in threaded bore 35 of shaft portion 34 as best seen in FIGS. 2 and 3.

Figure 18:
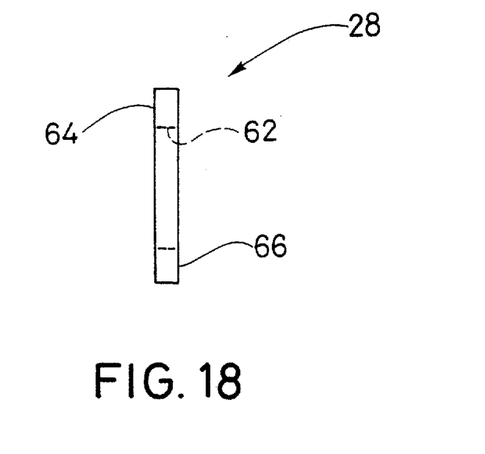
FIG. 18 is a top plan view of a washer of the guide for the bicycle control element illustrated in FIG. 3.
Figure 19:
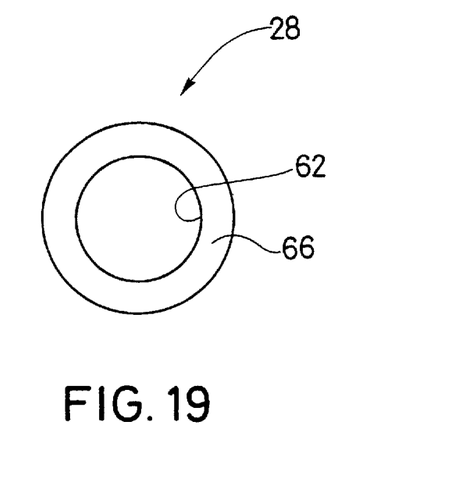
FIG. 19 is a right side elevational view of the washer illustrated in FIG. 18.

Referring to FIGS. 18 and 19, washer 28 is a rigid annular member. Washer 28 is arranged on shaft portion 34 of mounting member 22. Washer 28 is arranged between guide member 24 and bolt 26 when guide 11 is assembled, as seen in FIGS. 2 and 3. Washer 28 has a through bore 62, a first abutment surface 64 and a second abutment surface 66. Washer 28 is preferably constructed of a rigid die cast material, such as cast aluminum. Washer 28 is also preferably constructed as a one-piece unitary member. Of course, it will be apparent to those skilled in the art from this disclosure that washer 28 could be constructed of any suitable rigid material as needed and/or desired. It will also be apparent to those skilled in the art that washer 28 could be constructed of several pieces, or several washers could be used in place of single washer 28 as needed and/or desired.

Through bore 62 of washer 28 has an inner diameter the same or slightly large than shaft portion 34 so that washer 28 can be slidably received on shaft portion 34 of mounting member 22. Washer 28 has an outer diameter the same as the outer diameter of guide member 24. Therefore, first abutment surface 64 of washer 28 is arranged to contact abutment surface 47 of guide member 24. Second abutment surface 66 of washer 28 faces in an opposite direction relative to first abutment surface 64. Bolt 26 limits axial movement of washer 28 when second abutment surface 66 contacts bolt 26. In other words, washer 28 is held between guide member 24 and bolt 26. Washer 28 has a thickness smaller than the longitudinal space between abutment surface 47 of guide member 24 and bolt 26 when teeth 39 and 49 are completely engaged, as best seen in FIG. 3. Therefore, when washer 28 is mounted on shaft portion 34, a gap G can exist between washer 28 and either guide member 24 or bolt 26. The gap G has a width smaller than the longitudinal depth D of teeth 39 and teeth 49. Therefore, when guide 11 is assembled (i.e., washer 28 is positioned on shaft portion 34 and bolt 26 is positioned in threaded bore 35), relative rotation between guide member 24 and mounting member 22 is prevented.

Adjustment of guide 11 will now be discussed in more detail. Guide 11 is adjustable upon removal of bolt 26 from threaded bore 35. Specifically, teeth 49 of guide member 24 can be disengaged from teeth 39 of mounting member 32 when washer 28 is moved away from guide member 24 a distance corresponding to depth D of teeth 39 and 49. However, washer 28 cannot be moved more than the distance corresponding to gap G unless bolt 26 is removed. Therefore, when bolt 26 is removed, washer 28 can move past threaded bore 35 and guide member 24 can be rotated to position guide surface 46 in an optimal guiding position. Teeth 39 and 49 can then be re-engaged, washer 28 can be moved back into an assembled position and bolt 26 can be reinstalled in threaded bore 35 to hold guide surface 46 in the desired position.

The assembly and installation of guide 11 will now be discussed. Typically, the mounting member 22 will be inserted into the cable stopper 13 such that the flange 36 is received in the slot 13a. The guide member 24 can now be inserted on the shaft portion 34 of the guide member 24. The guide member 24 is oriented to the desired position with the mating teeth 39 of mounting member 22 engaging the mating teeth 49 of the guide member 24 to hold the desired orientation. Now the washer 28 is inserted over the shaft portion 34 of the mounting member 22 and the bolt 26 is threaded into the threaded bore 35 of the mounting member 22. This will prevent the mating teeth 39 and 49 from separating from each other. Further rotation of bolt 26 will cause the bolt 26 to engage the frame 12 of the bicycle 10 so that mounting member 22 is pressed against the inner surface of the tubular portion 13c of the cable stopper 13.

Thus, the guide 11 is now frictionally retained within cable stopper 13. Of course, it will be apparent to those skilled in the art from this disclosure that the assembly and installation of guide 11 can be performed in a different sequence, as needed and/or desired.

Second Embodiment

Figure 22:
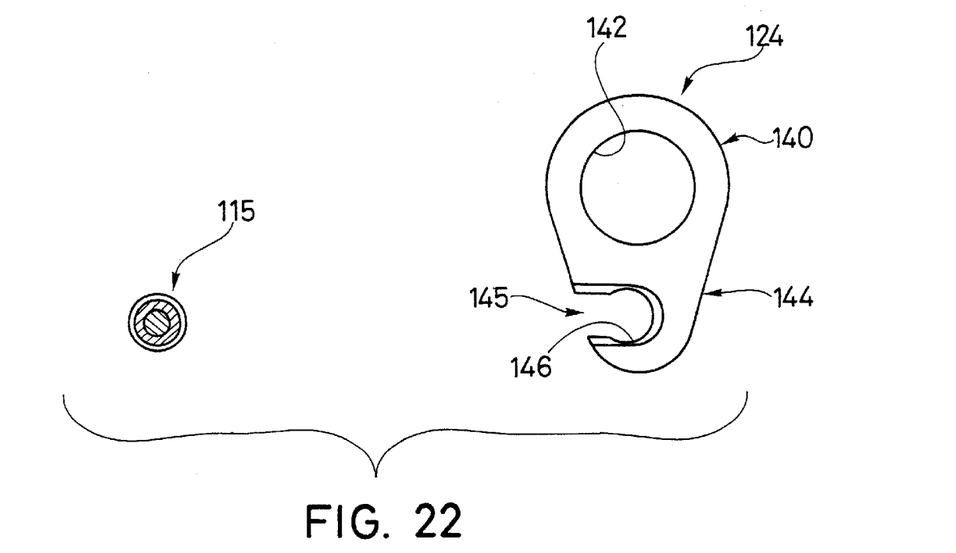
FIG. 22 an enlarged, exploded right side elevational view of a guide member and a control cable (shown in cross-section) in accordance with a second embodiment of the present invention.

Referring now to FIG. 22, a guide member 124 for use with control element or cable 115 is illustrated in accordance with a second embodiment of the present invention. This guide member 124 of the second embodiment is designed to be used in the guide 11 of the first embodiment by replacing guide member 24 with guide member 124. Therefore, only guide member 124 will be described and illustrated herein.

Guide member 124 includes a body portion 140 and a guide portion 144. Body portion 140 has a through bore 142 and guide portion 144 has a guide surface 146 formed as a recess 145. Guide member 124 is identical to guide member 24 of the first embodiment except that the configuration of guide surface 146 has been changed. Specifically, guide surface 146 of recess 145 has been enlarged to a accommodate the outer casing of a control cable 115.

Third Embodiment

Figure 23:
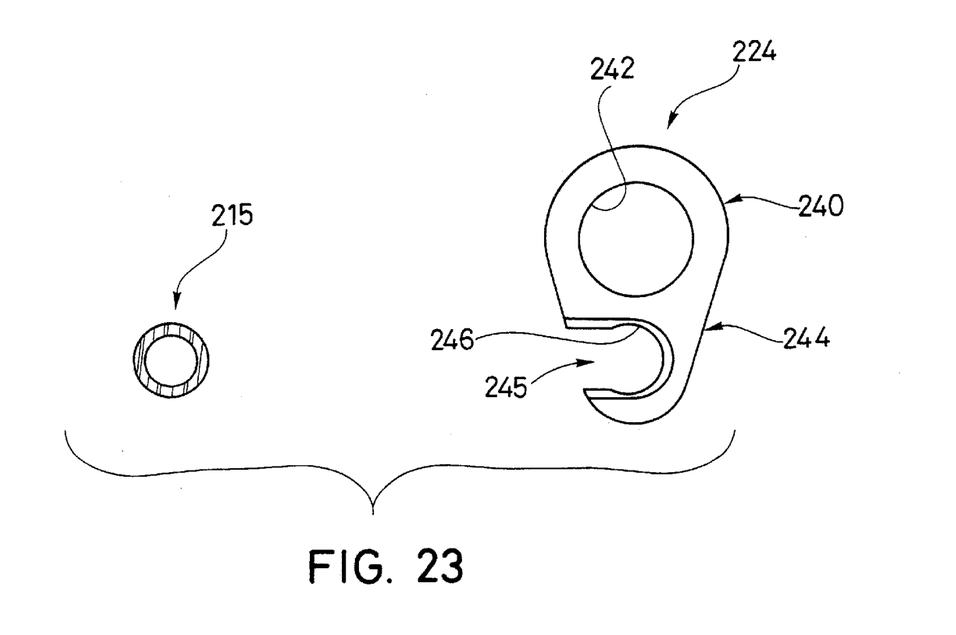
FIG. 23 is an enlarged, exploded right side elevational view of a guide member and a fluid hose (shown in cross-section) in accordance with a third embodiment of the present invention.

Referring now to FIG. 23, a guide member 224 for a control element or fluid hose 215 is illustrated in accordance with a third embodiment of the present invention. The guide member 224 of the third embodiment is designed to be used with the guide 11 of the first embodiment by replacing guide member 24 with guide member 224. Therefore, only guide member 224 will be described and illustrated herein.

Guide member 224 includes a body portion 240 and a guide portion 244. Body portion 240 has a through bore 242 and guide portion 244 has a guide surface 246 formed as a recess 245. Guide member 224 is identical to guide member 24 of the first embodiment except that the configuration of guide surface 246 has been changed. Specifically, guide surface 246 of recess 245 has been enlarged to accommodate fluid hose 215 of a fluid actuated component (not shown).

Fourth Embodiment

Figure 24:
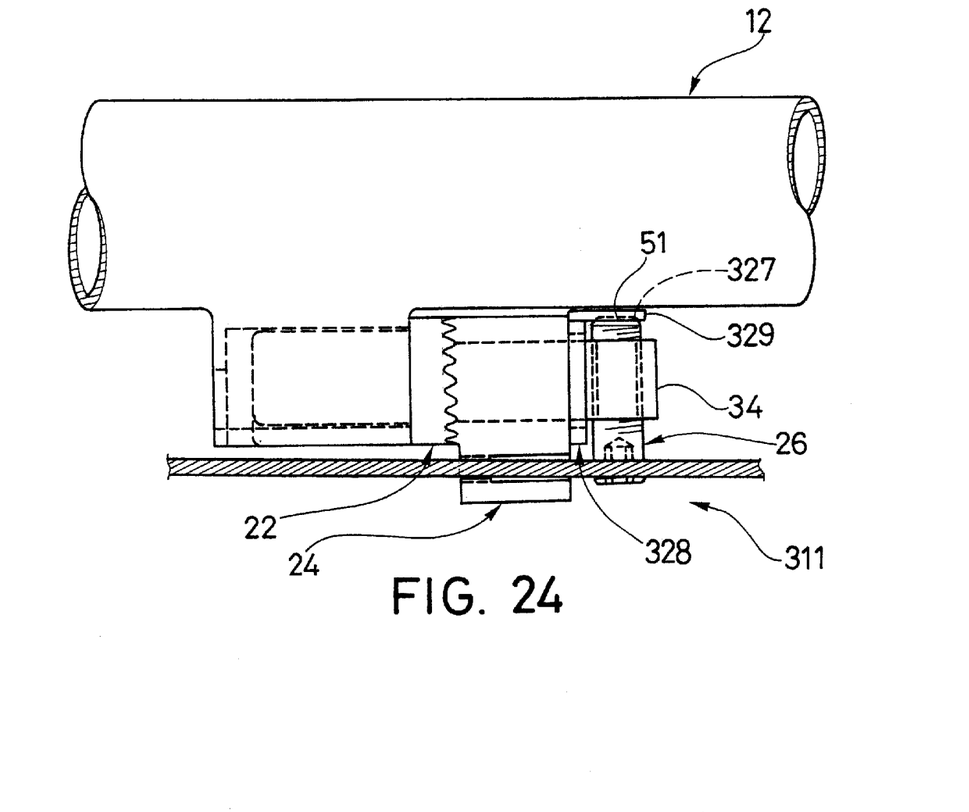
FIG. 24 is an enlarged top plan view of a portion of a bicycle with a guide for a bicycle control element coupled thereto in accordance with a fourth embodiment of the present invention.
Figure 25:
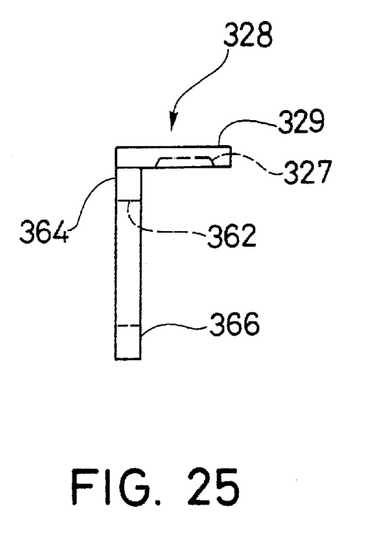
FIG. 25 is an enlarged top plan view of a washer of the guide for the bicycle control element illustrated in FIG. 24.
Figure 26:
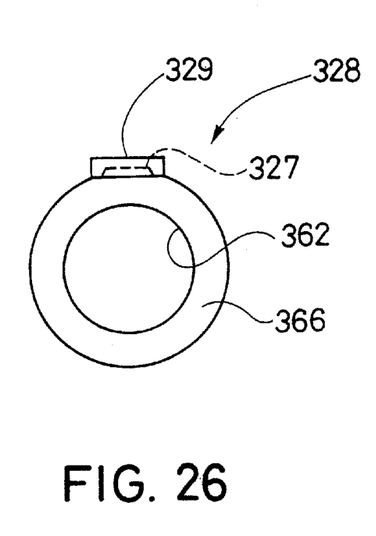
FIG. 26 is a right side elevational view of the washer illustrated in FIG. 25.

Referring now to FIGS. 24–26, a guide 311 in accordance with a fourth embodiment of the present invention is illustrated. Guide 311 is identical to guide 11 of the first embodiment, except that washer 28 has been replaced with washer 328, as explained below. Therefore, guide 311 will not be discussed or illustrated in detail herein. Additionally, parts that are identical to parts in the first embodiment will identified with the same reference numerals as in the first embodiment.

Washer 328 is substantially identical to washer 28 of the first embodiment, except that washer 328 is provided with a protrusion 329 extending therefrom and the size of the through bore 362. More, specifically, washer 328 has a through bore 362, a first abutment surface 364 and a second abutment surface 366. Through bore 362 is sized to slidably receive shaft portion 34 of mounting member 22. First abutment surface 364 engages guide member 24, and second abutment surface 366 engages bolt 26. Protrusion 329 extends from washer 328 at a substantially right angle thereto. Protrusion 329 is a plate-shaped portion that is located between abutment surface 51 of bolt 26 and a surface of frame 12. Preferably, protrusion 329 has a recess 327 to receive abutment surface 51 of bolt 26 so that bolt 26 will not slip when abutting the surface of protrusion 329. The diameter of through bore 364 is slightly larger than the outer diameter of the shaft portion of mounting member 22. Thus, when bolt 26 is tightened down against the protrusion 329, the protrusion 329 moves against the frame 12, while the mounting portion is pressed against the inner surface of the tubular portion 13c of cable stopper 13. Protrusion 329 prevents scratching and/or weakening of frame 12 caused by contact of bolt 26 with frame 12.

The terms of degree such as "substantially", "about" and "approximately" as used herein mean a reasonable amount of deviation of the modified term such that the end result is not significantly changed. These terms should be construed as including a deviation of ±25% of the modified term if this would not negate the meaning of the word it modifies. For example, "substantially perpendicular" as used herein may include two axes or two planes that deviate by plus or minus ten degrees from ninety degrees, but would not include 20°.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents.

What is claimed is:

1. A guide for a bicycle control element, said guide comprising:
    a mounting member adapted to be coupled to a portion of a bicycle, said mounting member having a first mating surface; and
    a guide member pivotally coupled to said mounting member about a pivot axis, said guide member having a guiding portion with a guide surface offset from said pivot axis, said guide member having a second mating surface engageable with said first mating surface to adjustably maintain said guide member in a predetermined rotational position relative to said mounting member.

2. The guide for a bicycle control element according to claim 1, wherein said first and second mating surfaces are formed of interlocking teeth.

3. The guide for a bicycle control element according to claim 1, wherein said mounting member has a mounting portion with a flange adapted to non-rotationally engage the portion of the bicycle.

4. The guide for a bicycle control element according to claim 1, wherein said guide member has a through bore and said mounting member has a shaft portion extending through said through bore.

5. The guide for a bicycle control element according to claim 4, wherein said shaft portion has a transverse threaded bore with a bolt arranged therein.

6. The guide for a bicycle control element according to claim 5, wherein said bolt has an abutment surface adapted to abut a surface of the bicycle.

7. The guide for a bicycle control element according to claim 5, wherein said bolt has a hexagonal bore.

8. The guide for a bicycle control element according to claim 5, wherein said bolt is formed of plastic resin material.

9. The guide for a bicycle control element according to claim 5, wherein said shaft portion has a washer mounted thereon adjacent said bolt.

10. The guide for a bicycle control element according to claim 9, wherein said bolt and said washer maintain said first and second mating surfaces in non-rotational engagement.

11. The guide for a bicycle control element according to claim 10, wherein said mounting member has a mounting portion with a flange adapted to non-rotationally engage the portion of the bicycle.

12. The guide for a bicycle control element according to claim 9, wherein said washer has a protrusion arranged to engage an end of said bolt and adapted to abut a surface of the bicycle.

13. The guide for a bicycle control element according to claim 12, wherein said protrusion has a recess arranged to receive said end of said bolt.

14. The guide for a bicycle control element according to claim 4, wherein said mounting member has a mounting portion with a flange adapted to non-rotationally engage the portion of the bicycle.

15. The guide for a bicycle control element according to claim 4, wherein said mounting member has an enlarged portion with an abutment surface adapted to abut the portion of the bicycle.

16. The guide for a bicycle control element according to claim 15, wherein said first mating surface is formed in said enlarged portion.

17. The guide for a bicycle control element according to claim 1, wherein said guide surface is a recess with a longitudinal axis that extends in a direction substantially parallel to said pivot axis.

18. The guide for a bicycle control element according to claim 1, wherein said guide surface is configured to guide an inner wire of a control cable.

19. The guide for a bicycle control element according to claim 1, wherein said guide surface is configured to guide an outer casing of a control cable.

20. The guide for a bicycle control element according to claim 1, wherein said guide surface is configured to guide a hose for a fluid actuated component.

21. The guide for a bicycle control element according to claim 1, wherein said guide member is formed of plastic resin material.

22. The guide for a bicycle control element according to claim 1, wherein said mounting member has an enlarged portion with an abutment surface adapted to abut the portion of the bicycle.

23. The guide for a bicycle control element according to claim 22, wherein said first mating surface is formed in said enlarged portion.

24. A guide for a bicycle control element, said guide comprising:
    a mounting member adapted to be coupled to a portion of a bicycle;
    a guide member pivotally coupled to said mounting member about a pivot axis, said guide member having a guiding portion with a guide surface, one of said guide member and said mounting member having a threaded bore substantially perpendicular to said pivot axis; and
    a bolt threadedly coupled within said threaded bore, said bolt being adapted to engage a surface of the bicycle in a substantially perpendicular relationship thereto.

25. The guide for a bicycle control element according to claim 24, wherein said mounting member has a first mating surface engageable with a second mating surface of said guide member to prevent relative rotation therebetween.

26. The guide for a bicycle control element according to claim 25, wherein said first and second mating surfaces are formed of interlocking teeth.

27. The guide for a bicycle control element according to claim 25, wherein said mounting member has a mounting portion with a flange adapted to non-rotationally engage the portion of the bicycle.

28. The guide for a bicycle control element according to claim 24, wherein said guide member has a through bore and said mounting member has a shaft portion extending through said through bore.

29. The guide for a bicycle control element according to claim 28, wherein said threaded bore is formed in said shaft portion.

30. The guide for a bicycle control element according to claim 28, wherein said shaft portion has a washer mounted thereon adjacent said bolt.

31. The guide for a bicycle control element according to claim 30, wherein said washer has a protrusion arranged to engage an end of said bolt and adapted to abut a surface of the bicycle.

32. The guide for a bicycle control element according to claim 31, wherein said protrusion has a recess arranged to receive said end of said bolt.

33. The guide for a bicycle control element according to claim 30, wherein said mounting member has a first mating surface engageable with a second mating surface of said guide member to prevent relative rotation therebetween, and said bolt and said washer maintain said first and second mating surfaces in non-rotational engagement.

34. The guide for a bicycle control element according to claim 24, wherein said mounting member has a mounting portion with a flange adapted to non-rotationally engage the portion of the bicycle.

35. The guide for a bicycle control element according to claim 24, wherein said bolt has a hexagonal bore.

36. The guide for a bicycle control element according to claim 24, wherein said bolt is formed of plastic resin material.

37. The guide for a bicycle control element according to claim 24, wherein said guide surface is a recess with a longitudinal axis that extends in a direction substantially parallel to said pivot axis.

38. The guide for a bicycle control element according to claim 24, wherein said guide surface is configured to guide an inner wire of a control cable.

39. The guide for a bicycle control element according to claim 24, wherein said guide surface is configured to guide an outer casing of a control cable.

40. The guide for a bicycle control element according to claim 24, wherein said guide surface is configured to guide a hose for a fluid actuated component.

41. The guide for a bicycle control element according to claim 24, wherein said guide member is formed of plastic resin material.

42. The guide for a bicycle control element according to claim 24, wherein said threaded bore is formed in said shaft portion.

43. The guide for a bicycle control element according to claim 24, wherein said mounting member has an enlarged portion with an abutment surface adapted to abut the portion of the bicycle.

\* \* \* \* \*